US012387187B2

(12) United States Patent
Herring et al.

(10) Patent No.: US 12,387,187 B2
(45) Date of Patent: *Aug. 12, 2025

(54) SYSTEMS AND METHODS FOR REMOTELY INTERACTING WITH PERFORMERS AND INFLUENCING LIVE EVENTS

(71) Applicant: Paul M. Herring, Mt. Pleasant, SC (US)

(72) Inventors: Paul M. Herring, Mt. Pleasant, SC (US); Josef Kirk Myers, II, Venice, CA (US); William Paul Herring, Mt. Pleasant, SC (US); Nicholas David Rawn, Los Angeles, CA (US)

(73) Assignee: Paul M. Herring, Mt. Pleasant, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,557

(22) Filed: Oct. 13, 2023

(65) Prior Publication Data
US 2024/0062177 A1    Feb. 22, 2024

Related U.S. Application Data

(63) Continuation of application No. 18/185,082, filed on Mar. 16, 2023, now Pat. No. 11,823,150, which is a
(Continued)

(51) Int. Cl.
*G06F 3/048*    (2013.01)
*G06F 3/0481*    (2022.01)
(Continued)

(52) U.S. Cl.
CPC ......... *G06Q 20/123* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS 7,124,186 B2    10/2006    Piccionelli
2008/0239887 A1    10/2008    Tooker et al.
(Continued)

OTHER PUBLICATIONS

International Search Report and Written Opinion for corresponding International Application No. PCT/US2024/019495, mailed Jul. 4, 2024.

*Primary Examiner* — Thanh T Vu
(74) *Attorney, Agent, or Firm* — K&L Gates LLP

(57) ABSTRACT

A computer-implemented method of remotely influencing a performer at a live event is disclosed herein. The method, for example, can be implemented via a customer device including a display, a processor, and a memory configured to store an application that, when executed by the processor, causes the processor to perform the method. The method can include displaying a graphical user interface configured to receive user inputs, receiving a first user input including a user request for the performer to take a user-specified action during the live event, displaying terms and conditions associated with the user request, receiving a second user input including a user acceptance of the terms and conditions associated with the user request, and transmitting the user request to a performer device upon receiving the user acceptance of the terms and conditions associated with the user request.

23 Claims, 12 Drawing Sheets

Related U.S. Application Data continuation-in-part of application No. 17/821,213, filed on Aug. 22, 2022, now Pat. No. 11,790,339, which is a continuation of application No. 17/360,314, filed on Jun. 28, 2021, now Pat. No. 11,455,607.

(60) Provisional application No. 63/044,677, filed on Jun. 26, 2020.

(51) Int. Cl.
*G06F 3/04842* (2022.01)
*G06F 16/632* (2019.01)
*G06F 16/683* (2019.01)
*G06Q 20/12* (2012.01)
*G06Q 20/32* (2012.01)
*H04N 21/2187* (2011.01)
*H04N 21/472* (2011.01)
*H04N 21/478* (2011.01)
*H04N 21/81* (2011.01)

(52) U.S. Cl.
CPC .......... *G06F 16/634* (2019.01); *G06F 16/685* (2019.01); *G06Q 20/3267* (2020.05); *H04N 21/2187* (2013.01); *H04N 21/472* (2013.01); *H04N 21/478* (2013.01); *H04N 21/8113* (2013.01)

(56) References Cited

U.S. PATENT DOCUMENTS

| | | |
|---|---|---|
| 2010/0077017 A1 | 3/2010 | Martinez et al. |
| 2011/0199180 A1 | 8/2011 | Holman |
| 2013/0070093 A1* | 3/2013 | Rivera ............... H04N 21/4302 348/143 |
| 2014/0229321 A1* | 8/2014 | Ranganath ......... G06Q 30/0619 705/26.7 |
| 2017/0032336 A1* | 2/2017 | Connell ................. G06Q 20/10 |
| 2020/0077157 A1* | 3/2020 | Kurabuchi ......... H04N 21/4316 |
| 2020/0111173 A1* | 4/2020 | Benfield ............. G06F 16/4393 |
| 2023/0039768 A1 | 2/2023 | Herring et al. |
| 2023/0222466 A1 | 7/2023 | Herring et al. |

* cited by examiner

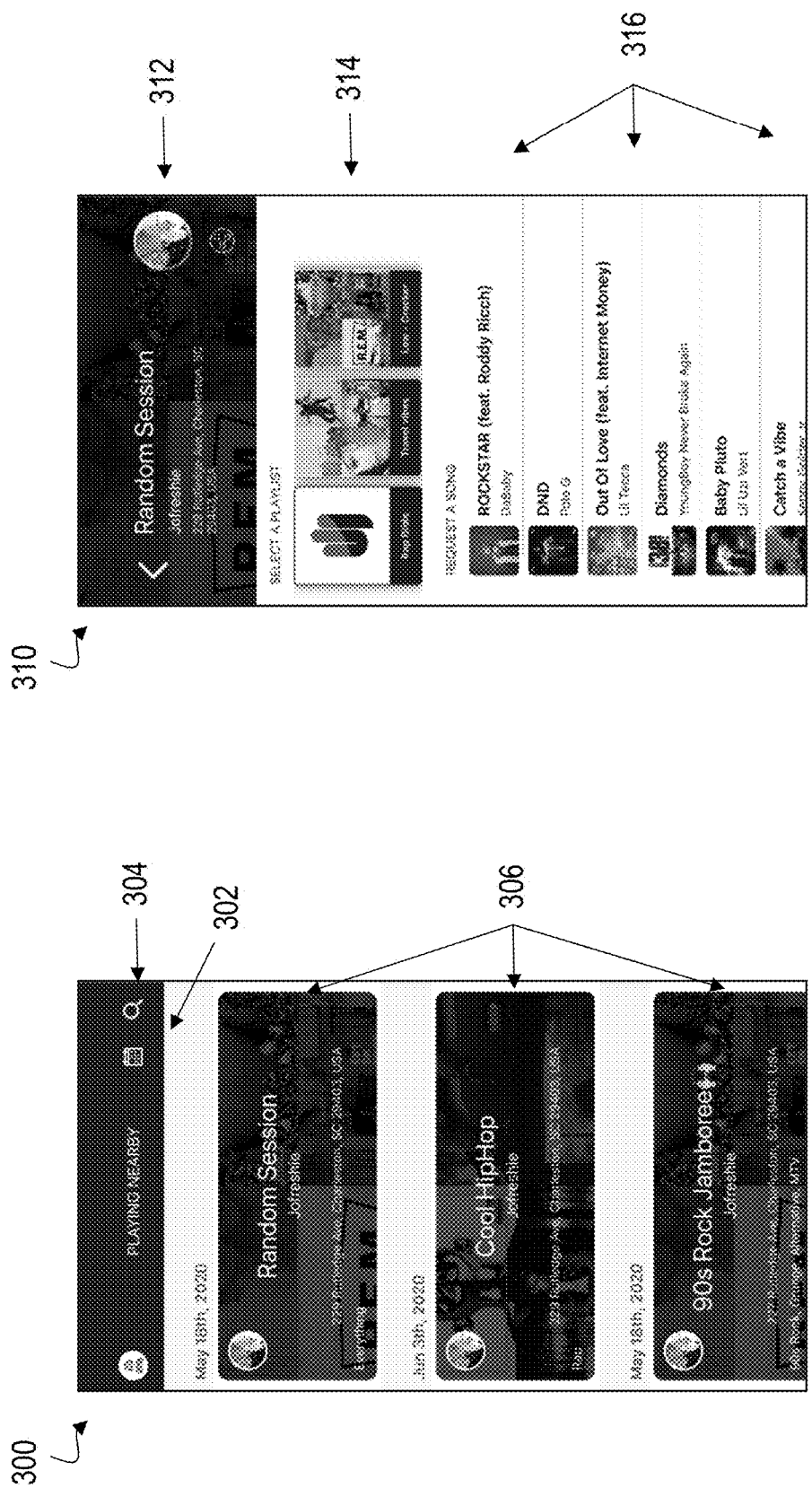

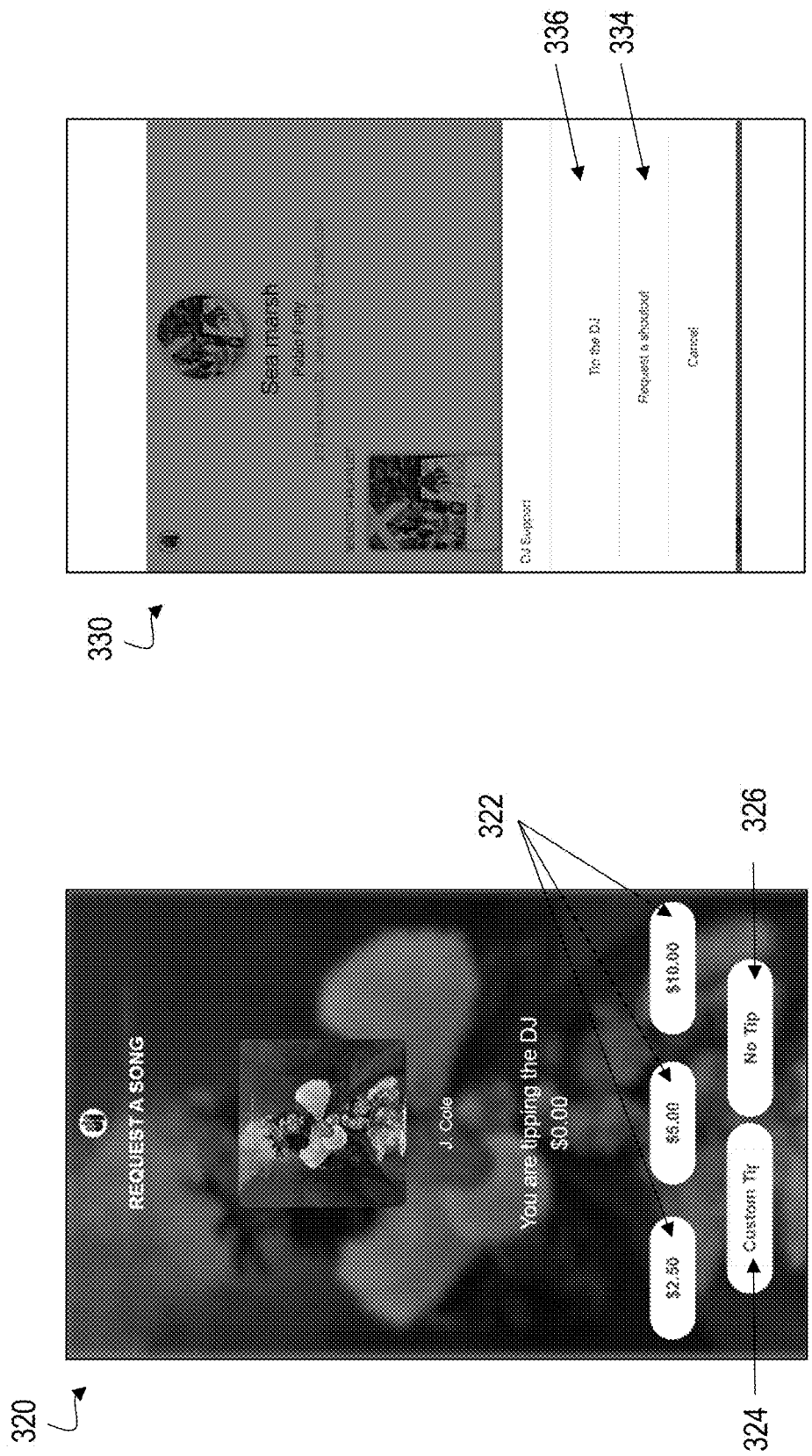

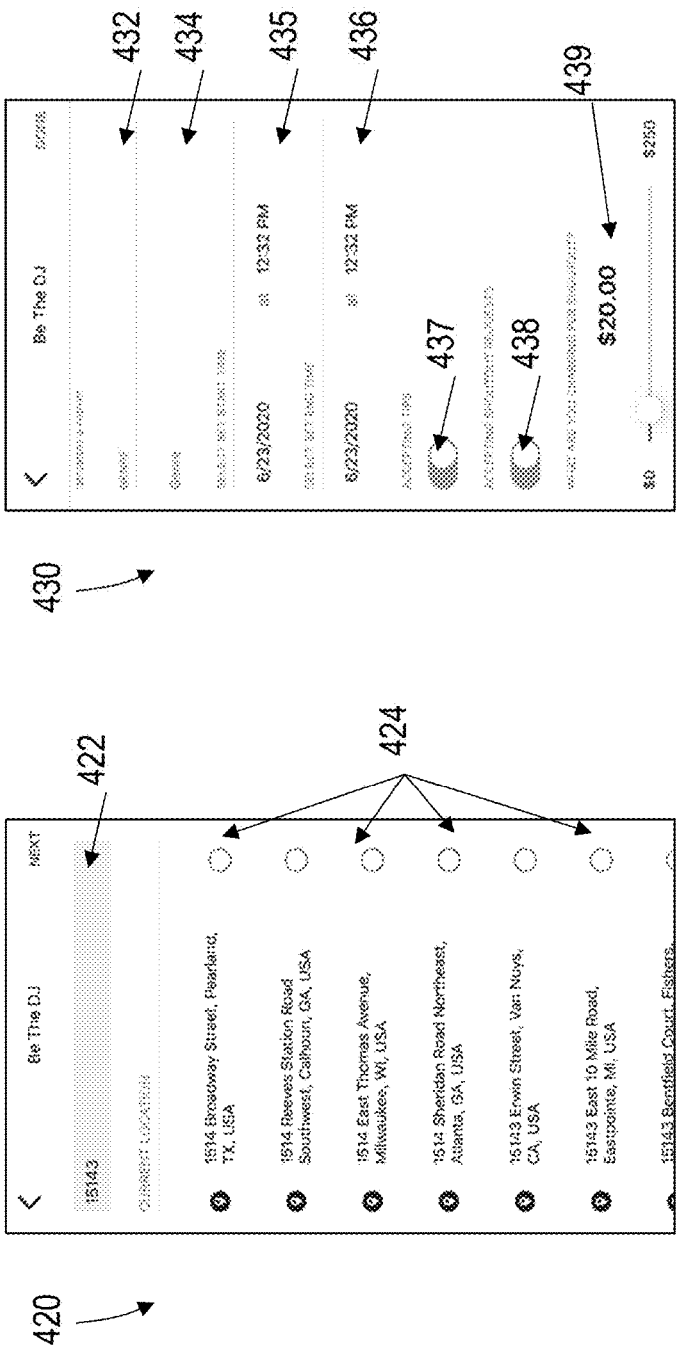

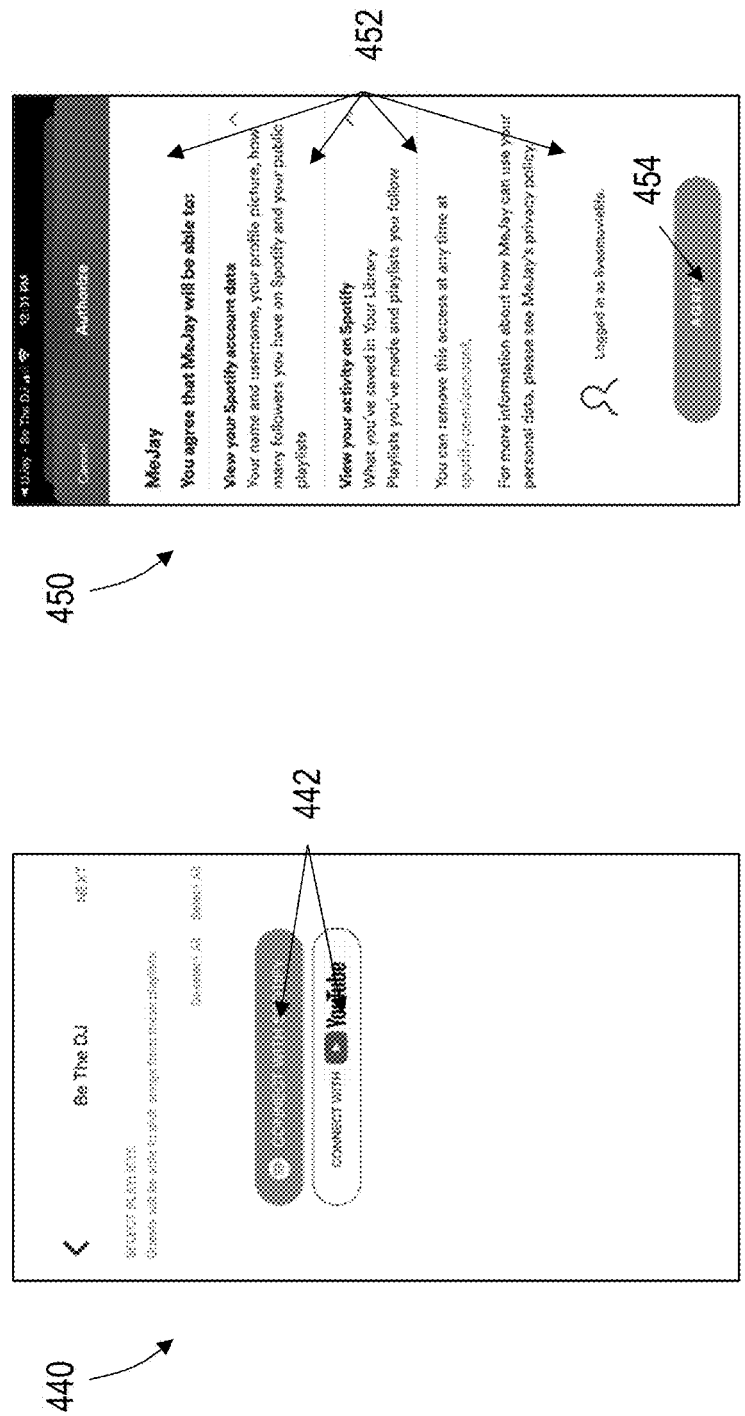

SYSTEMS AND METHODS FOR REMOTELY INTERACTING WITH PERFORMERS AND INFLUENCING LIVE EVENTS

CROSS-REFERENCE TO RELATED APPLICATION

This application is a continuation application claiming priority under 35 U.S.C. § 120 to U.S. patent application Ser. No. 18/185,082 filed on Mar. 16, 2023, which is a continuation-in-part and which claims the benefit under 35 U.S.C. § 119 (e) of U.S. application Ser. No. 17/821,213 filed Aug. 22, 2022 and issued as U.S. Pat. No. 11,790,339, which is a continuation of U.S. patent application Ser. No. 17/360,314 filed Jun. 28, 2021 and issued as U.S. Pat. No. 11,455,607, and which claims the benefit of Provisional Application No. 63/044,677 filed on Jun. 26, 2020, the contents of which is hereby incorporated by reference in its entirety herein.

BACKGROUND

The combined advent of mobile devices, WiFi®, high-speed cellular networks, and cloud computing has enabled the average consumer to access a seemingly endless supply of media from their pockets, on a whim. In spite of this increased access to on-demand entertainment, live events such as musical performances, sporting events, and shows remain popular pastimes. Even smaller venues may hire a disc jockey (hereinafter "DJ"), a cover band, and/or a comedian in an effort to attract more customers. However, attendees at such events are typically passive consumers of live entertainment and are limited in the ways they can interact with a performer and/or influence a performance at such live events. This is especially true when compared to the on-demand nature of their entertainment consumption at home.

SUMMARY

In one general aspect, the present disclosure contemplates a computer-implemented method of remotely influencing a performer at a live event via a customer device of a user. The customer device can include a display, a memory and a processor, and software can be preloaded onto the memory of the customer device that, when executed by the processor, causes the processor to perform the method. The method can include displaying, via the display, a graphical user interface configured to receive user inputs, receiving, via the graphical user interface, a first user input comprising a user request for the performer to take a user-specified action during the live event, displaying, via the graphical user interface, terms and conditions associated with the user request, receiving, via the graphical user interface, a second user input comprising a user acceptance of the terms and conditions associated with the user request, and transmitting, via the processor, the user request to a performer device upon receiving the user acceptance of the terms and conditions associated with the user request.

In another general aspect, the present disclosure contemplates a computer-implemented method of remotely influencing a performer at a live event via a customer device of a user. The customer device can include a display, a processor, and a memory configured to store an application that, when executed by the processor, causes the processor to perform the method. The method can include displaying, via the display, a graphical user interface configured to receive user inputs, receiving, via the graphical user interface, a first user input comprising a user request for the performer to take a user-specified action during the live event, displaying, via the graphical user interface, terms and conditions associated with the user request, receiving, via the graphical user interface, a second user input comprising a user acceptance of the terms and conditions associated with the user request, transmitting, via the processor, the user request to a performer device upon receiving the user acceptance of the terms and conditions associated with the user request, and receiving, via the processor, a coupon to be displayed via graphical user interface.

In another general aspect, the present disclosure contemplates a system for remotely influencing a performer at a live event. The system can include a host server, a performer device, and a customer device. The customer device can include a processor and a memory configured to store an application that, when executed by the processor, causes the customer device to display a graphical user interface configured to receive user inputs, receive, via the graphical user interface, a first user input comprising a user request for the performer to take a user-specified action during the live event, receive, via the processor, terms and conditions associated with the user request from the host server, display, via the graphical user interface, the terms and conditions associated with the user request, receive, via the graphical user interface, a second user input comprising a user acceptance of the terms and conditions associated with the user request, and transmit, via the processor, the user request to the performer device upon receiving the user acceptance of the terms and conditions associated with the user request.

BRIEF DESCRIPTION OF THE DRAWINGS

Various embodiments are described herein by way of example in connection with the following figures, wherein:

FIGS. 3A-3D depict several user interfaces of a mobile application, as viewed by a using customer, configured to enable the remote interaction with a live performer according to at least one non-limiting aspect of the present disclosure;

FIGS. 4A-4H depict several user interfaces of a mobile application, as viewed by a live performer, configured to enable the remote interaction with a using customer according to at least one non-limiting aspect of the present disclosure;

DETAILED DESCRIPTION

Figure 1:
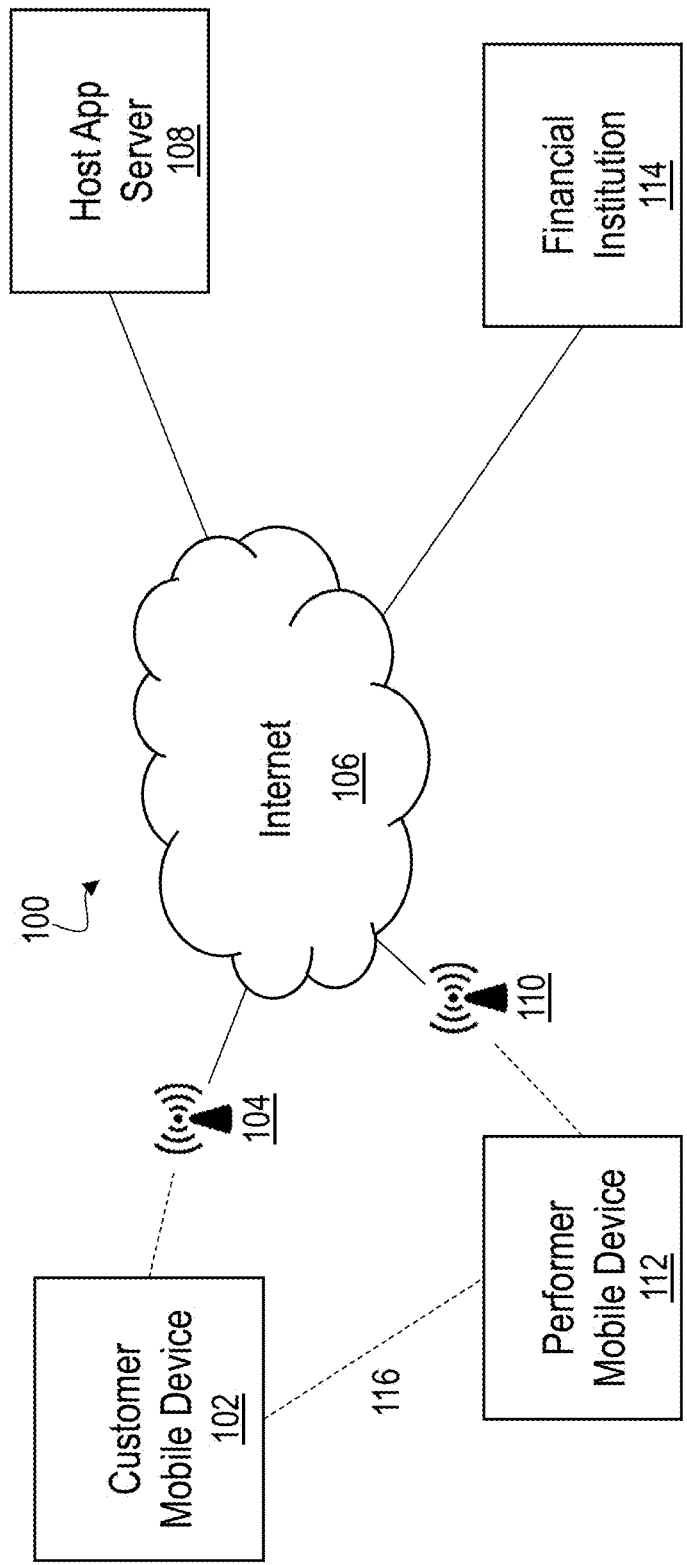
FIG. 1 depicts a system diagram of a system configured to enable a remote interaction with a live performer according to at least one non-limiting aspect of the present disclosure.

The present invention is directed, in various embodiments, to computer systems and computer-implemented methods that enable a person to interact with a performer and/or influence a live event. Accordingly, these systems and methods can be applied to many different forms of live events or entertainment, including but not limited to musical performances, such as concerts and DJ performances, sporting events, any form of theatrical show, improvisational events, comedy shows, variety shows, live streams (e.g., video game demonstrations), e-sports (e.g., video game tournaments), trivia events, lectures, conferences, presentations, live interviews, question-and-answer sessions, webinars, product demonstrations, exercise demonstrations or classes, cooking presentations, amongst other live performances. However, "live performance" is broadly implemented throughout the present disclosure. A "live performance" shall be construed to include any performance hosted by a venue for the benefit of audience members. Non-limiting examples of a venue include theatres, stadiums, bars, halls, clubs, restaurants, parks, catering venues, and more. For example, a live stream of an event that is occurring in real-time can constitute a live performance if it is streamed for the benefit of an audience at a venue. Likewise, events and/or performances that are pre-recorded and re-played for the benefit of an audience, such as a movie or musical performance re-played in a movie theatre, park, or restaurant, can constitute a live performance according to the present disclosure. As such, any individual hired by a venue and capable of effecting the live performance shall constitute a "live performer" according to the present disclosure. For example, a live performer can be a DJ, musician, athlete, and/or actor. Likewise, a live performer can be a manager of the venue, a master of ceremonies, and/or operational personnel, such as an employee responsible for operating a public announcement system, projector, or jumbotron.

As used herein, the expression "term" can include, in a broad sense, one aspect of an agreement between a user of the devices, systems, and methods disclosed herein and a live performer at a live event. The user may have to agree to one or more "terms" that govern the use of the devices, systems, and methods disclosed herein to interact with the live performer and influence the live event. For example, a user may have to agree to a term specifying that they will be charged for the submission of a request to the live performer, regardless of whether or not the live performer fulfills that request during the live performance.

As used herein, the expression "condition" can include a specific "term" that grants either the user of the devices, systems, and methods disclosed herein or the live performer at the live event a unilateral right or obligation under the agreement. A user may have to agree to a condition specifying that a request to the live performer will not be submitted until certain prerequisite qualifications of the terms are confirmed. For example, a financial institution server and/or host application server confirms that the user has a required balance in an account maintained with the financial institution. Alternately, a user may have to agree to a condition specifying that the live performer will only be obligated to fulfill that request during the live performance if the user outbids other users of the devices, systems, and methods disclosed herein. In other words, a particular "term" can be contingent on a particular "condition" of the agreement.

It shall be further appreciated that the expression "terms and conditions" is colloquially used to include all of the rules governing a contractual relationship between a provider of a product or service and a user of that product or service, regardless of whether the agreement is governed by a single "term" or a single "condition." Therefore, as used herein, collective use of the expression "terms and conditions" can refer to all of the provisions governing an agreement between a user of the devices, systems, and methods disclosed herein and a live performer at a live event, regardless of whether that agreement is governed by a single "term" or a single "condition."

The methods and systems disclosed herein provide opportunities for attendees at such events to interact with performers and influence such live events. For example, the systems and methods disclosed herein can enable an audience member to request a certain song, comment on the performance and/or provide feedback, which may or may not be made public, and/or request a specific message be displayed or announced. For illustrative purposes, the following will explain how an audience member can request a specific song and/or shout out from a DJ performing at a club or bar. However, it shall be appreciated that the systems and methods disclosed herein can be implemented to accommodate a wide variety of requests from audience members attending a wide variety of live events.

Referring now to FIG. 1, a system diagram of a system 100 configured to enable a remote interaction with a live performer is depicted in accordance with at least one non-limiting aspect of the present disclosure. The system 100 of FIG. 1 can include a customer mobile device 102, a performer mobile device 112, one or more access points 104, 110 configured to connect the mobile devices 102, 112 to the internet 106, a host server 108, and a financial institution 114. The customer mobile device 102 of FIG. 1 can be configured to connect to the internet 106 via an access point 104. Non-limiting examples of customer mobile device 102 can include a cell phone, a smart phone, a tablet, a wearable, a laptop, a personal digital assistant, or any other consumer electronic device configured to connect to the internet 106. In some non-limiting embodiments, the customer mobile device 102 may not be mobile in a conventional sense and thus, can include a personal desktop computer. As will be explained in further detail, the customer mobile device 102 can be further configured to display a graphical user interface (hereinafter "GUI") configured to receive customer inputs, as depicted in FIGS. 3A-3B.

According to some non-limiting aspects of the present disclosure, the access point 104 of FIG. 1 can be configured to connect the customer mobile device 102 to the internet 106 via a wireless network such as WiFi®. In other non-limiting aspects, the access point 104 can be configured to connect the customer mobile device 102 to the internet 106 via a cellular network. In such aspects, the access point 104 can be a cellular tower. Accordingly, the present disclosure contemplates aspects in which the access point 104 uses any conventional means of connecting the customer mobile device 102 to the internet 106. Because the customer mobile device 102 is connected to the internet 106 the customer can use the system 100 to interact with a performer and/or influence a live event from any remote location. For example, if the customer is attending the DJ's performance, they may use a smart phone to send a specific song request to the DJ. Alternatively, a friend of the audience member may request a specific song to be played for the benefit of the audience member by using their laptop computer from the comfort of their home. Thus, it shall be appreciated that, as used herein, the term "remote" can include aspects wherein the user is physically present at the venue, or not physically present at the venue. In the non-limiting aspect where the customer is an audience member who is physically present at the venue, the access point 104 and internet 106 can be circumvented and the customer mobile device 102 can directly communicate the request to the performer mobile device 112 via short-range wireless technology, such as near field communication (hereinafter "NFC") and/or Bluetooth®.

In further reference to FIG. 1, a customer can use the customer mobile device 102 to issue a request to a live performer and thus, influence the live performance. The customer may do this by accessing a GUI. In some non-limiting aspects the GUI can be accessed via software that is preloaded onto the customer's mobile device 102. In other non-limiting aspects, the GUI can be externally hosted and accessed via the internet 106. Nonetheless, the customer mobile device 102 can provide a conduit for the customer to initiate the request.

The GUI (FIGS. 3A-3B) can be configured to present the customer with terms and conditions associated with the request, as defined by a user and stored on the host server 108. Thus, the GUI, as viewed via the customer mobile device 102 of FIG. 1, can require that the customer use the mobile device 102 to review and agree to the terms and conditions prior to enabling the customer mobile device 102 to initiate the request. After the customer agrees to the terms and conditions, the customer mobile device 102 can initiate the request and relay it via the access point 104 to the internet 106, where it is directed to one of several internet 106 connected different destinations, such as a host server 108. According to some non-limiting aspects, the host server 108 can be a separate computer configured to process the request and ensure that any terms and conditions associated with the request are satisfied prior to forwarding the request to the performer's mobile device 112. For example, if the terms and conditions associated with the request require payment, the host server 108 can forward the request to a financial institution 114 for processing. For example, the financial institution 114 can be a bank that maintains and manages a bank account the customer has linked to their user profile, which is stored in the host server 108. Additionally and/or alternatively, the financial institution 114 can be a third-party service, such as PayPal®, Square®, or the like. Essentially, the financial institution 114 of FIG. 1 represents any server capable of processing a payment on behalf of the host server 108. Once the financial institution 114 processes the payment, the host server can be configured to confirm that the payment has been processed and that all additional terms and conditions associated with the request have been satisfied.

According to some aspects, the live performer can require a using customer to agree with a term and condition that dissociates payment from request. Accordingly, the terms and conditions stored on the host server 108 can ensure that the using customer is exclusively sending payment to the live performer as a tip for the services they are providing via the performance itself, not the content. Such terms and conditions can protect the live performer by ensuring that they are compensated regardless of the nature of the request. Additionally and/or alternatively, the system 100 can be employed to ensure compliance with local customs governing the performance of protected content. For example, terms and conditions can be developed to ensure the live performer is complying with relevant copyright and other laws.

Still referring to FIG. 1, the host server 108, having confirmed that the terms and conditions associated with the request have been satisfied, can be further configured to forward the request to a performer mobile device 112, which is connected to the internet 106 via access point 110. The performer mobile device 112 can include any of the aforementioned mobile devices used to describe the customer mobile device 102. In other non-limiting aspects, the performer mobile device 112 can include a computer associated with the performer's equipment. For example, the performer mobile device 112 can constitute a module installed on a DJ's laptop that he is using as part of his set. According to the non-limiting aspect wherein the customer is an audience member physically present at the venue, access point 110 can be the same as access point 104, which the customer mobile device 102 previously used to access the internet 106. However, in the non-limiting embodiment wherein the customer is not physically present at the live event, access point 110 can be completely independent of access point 104. Regardless, the access point 110 can be similarly configured to access point 104 to utilize either WiFi® or a cellular network to connect the performer mobile device 112 to the internet 106. Accordingly, the performer mobile device 112 can be configured to receive the request from the host server 108 via the internet 106.

Upon receiving the request, the performer mobile device 112 of FIG. 1 can notify the performer via a separate GUI, accessible only by registered performers and displayed via the performer mobile device 112, that a request has been initiated by the customer mobile device 102. The performer may further be notified that the host server 108 has confirmed that the terms and conditions associated with the request have been satisfied, thereby assuring the performer that they can fulfill the request. In the non-limiting aspect wherein the performer is a DJ, the request may be to play a specific song or announce a desired message, or "shout-out." For example, the customer may be in the audience and hoping to hear their favorite song, which may otherwise not be played. As will be appreciated, conventional systems lacked the ability to formally (and clearly) process such a request. Typically, if an audience member wanted to request a specific song from a DJ, they would have to work their way through a crowd and, literally, shout their request audibly, hoping the DJ would hear it over the song that was currently playing. Furthermore, a customer that was not in the audience would not be able to make such a request because no existing machine, system, or method, allowed them to communicate with a DJ performing in a different building, city, state, or even country.

According to some aspects, the customer mobile device 102 is further configured to confirm that the request has been fulfilled. For example, the customer mobile device 102 can include a microphone that can detect sound waves and a processor to digitize the sound waves into a signal. A processor of the customer mobile device 102 can further include an analog-to-digital converter ("ADC") connected to the microphone, wherein the ADC is configured to convert analog audio picked up by the microphone to digital form. Accordingly, the customer mobile device 102 can detect soundwaves emitted from the DJ's equipment, digitize them into a signal via the ADC, and transmit the signal to the host server 108 via the access point 104 and internet 106. It shall be understood that most modern computing devices, such as a smart phone or a laptop, for example, can include processors, microphones, ADCs, off the shelf. Accordingly, such internal components are not expressly illustrated in the figures. The host server 108 can further include a processor and a memory configured to store a sound recognition module that, when executed by the processor, can compare the signal to a database of songs stored in the memory to identify a song that the DJ played. Alternatively, the database of songs can be stored on a cloud-based server, which, in some non-limiting aspects, is the host server 108. Additionally and/or alternatively, the sound recognition module can include a voice recognition module to identify words spoken by the DJ, thereby confirming that the requested "shout-out" has been fulfilled. In some non-limiting aspects, the terms and conditions associated with the request can make processing of the payment conditional on customer mobile device 102 receiving confirmation from the host server 108 that the request has been fulfilled.

As previously noted, the non-limiting aspect wherein the system 100 of FIG. 1 is implemented to enable a customer to interact with a DJ and influence the DJ's set list is merely intended to be illustrative of some of the improvements offered by system 100. It will be evident that system 100 can be implemented across a wide variety of applications to enable the remote interaction with performers and the ability to influence live events. For example, in some non-limiting aspects, the system 100 can be implemented to enable fans attending a sporting event to have a desired message displayed on the jumbotron and/or any other screen, display, or speaker installed at the venue. The message, for example, can include a birthday message, a marriage proposal, or an impromptu advertisement for the user's business, or the sponsorship of a segment or portion of the live event. According to some non-limiting aspects, the system 100 can be configured to separate requests based on a request type (e.g., personal, commercial, etc.). For example, requests for a personal message (e.g., a "shout-out," a birthday message, a marriage proposal, etc.) may be governed by a different term and/or condition than a commercial request (e.g., an advertisement, a segment sponsorship, etc.), as an auction or "crowd-sourcing" term may be preferred for certain requests and commercial entities may be have more resources at their disposal to monopolize the system 100. System 100 can be further employed to ensure an audience member is featured on the jumbotron. For example, previous systems did not enable a using customer to call the field cameraman responsible for featuring fans. However, system 100 can allow a fan to enter their seat location and request, pay, and/or bid to ensure their child is featured on the big screen during a game or to ensure the user and their partner are featured during a "kiss-cam" segment of a game. Of course, the aforementioned aspects described in reference to a jumbotron shall not be limited to sporting events, and can be similarly implemented at a concert, conference, performance, etc. In still other non-limiting aspects, the system 100 can be implemented to conduct a poll or solicit feedback on the live event. Likewise, the terms and conditions can be customized to enable a degree of interactivity that was not previously offered by existing machines, systems, or methods. For example, according to one non-limiting aspect of the present disclosure, the terms and conditions stored in the host server 108 can be configured to simulate an auction, wherein each request is accompanied by a conditional bid. For example, a performer might use the system 100 to auction off the song they will play as an encore at a concert. The terms and conditions can be specifically configured to process the payment of the highest bidder and refund the bids associated with requests that are not fulfilled. In still other non-limiting aspects, the host server 108 can issue a notification to mobile device 102 of the customer that submitted the highest bid, which can be shown to security and enable the customer to join the performer on stage for the encore. According to other non-limiting aspects, a request may be "crowd-sourced," wherein a plurality of user mobile devices 102 of the system 100 of FIG. 1 can submit requests subject to any of the aforementioned terms and/or conditions. The requests can be aggregated and the most requested action is selected by the performer for execution during the live performance. Although these aspects certainly illustrate the improvements offered by system 100, they are just a few of the many implementations contemplated by the present disclosure.

In further reference to FIG. 1, the system 100 can be implemented to enable truly remote interactions with a live performer, regardless of a physical separation of the customer from the performer. As previously noted, a friend of an audience member may request a specific song to be played for the benefit of the audience member by using their laptop computer from the comfort of their home. According to this non-limiting aspect, the customer is not the audience member, but the friend of the audience member who can be located miles away from the performer, yet able to interact with the performer and influence the live event via the system 100 of FIG. 1.

According to some non-limiting aspects, the system 100 can be particularly configured to receive non-monetary and/or non-fiat-based payments. Thus, the financial institution 114 can include institutions and/or services that are "financial" in a less conventional sense. For example, the system 100 of FIG. 1 can be particularly configured to accept a "token" in lieu of a fiat-based payments, such as a cryptocurrency, a line of credit, membership reward points issued by a user's credit card company, and/or loyalty reward points issued by a frequently visited merchant, amongst others. Therefore, according to such non-limiting aspects, the financial institution 114 can include a cryptocurrency exchange server, a credit card issuer server, and/or a merchant server, amongst other servers configured to access, manage, transfer, and/or exchange non-fiat-based currencies of the user.

According to still other non-limiting aspects, the system 100 of FIG. 1 can be alternately configured such that no payments (e.g., fiat-based or non-fiat-based) are required at all. According to such non-limiting aspects, the system 100 can be configured such that a user—via the customer mobile device 102—can agree to a term and/or condition that does not implicate a payment. For example, the user—via the customer mobile device 102—may be required to provide the live performer, venue, and/or event sponsor, user data, such as a valid email address, physical address, phone number, and/or a consumer preference, amongst other forms of user data that can be used for marketing purposes. According to some non-limiting aspects, the user may be required to agree to the sharing and/or sale of the provided user data prior to being able to submit the request. According to other non-limiting aspects, the user may be required to complete a user-initiated promotion. For example, the user may be required to forward a notification to a friend—including an alert that the user is at the particular event and/or particular venue, a consumer suggestion, and/or a coupon, amongst other notifications—prior to being able to submit the request. According to still other non-limiting aspects, the user may be required to complete a user action—including the purchase of a product or service via a website accessed via the customer mobile device 102, completion of a survey accessed via the customer mobile device 102, and/or completion of an engagement action (e.g., creating a post, liking a post, commenting on a post, sharing a post) associated with the venue and/or event via a social media platform (e.g., Facebook®, Instagram®, Tik-Tok®, Twitter®, Snapchat®), amongst other user actions—prior to being able to submit the request. Therefore, according to such non-limiting aspects, the financial institution 114 can include an ecommerce server, a venue server, a social media platform server, and/or an email server, amongst other servers configured to confirm the non-fiat-based term and/or condition has been fulfilled.

Figure 2:
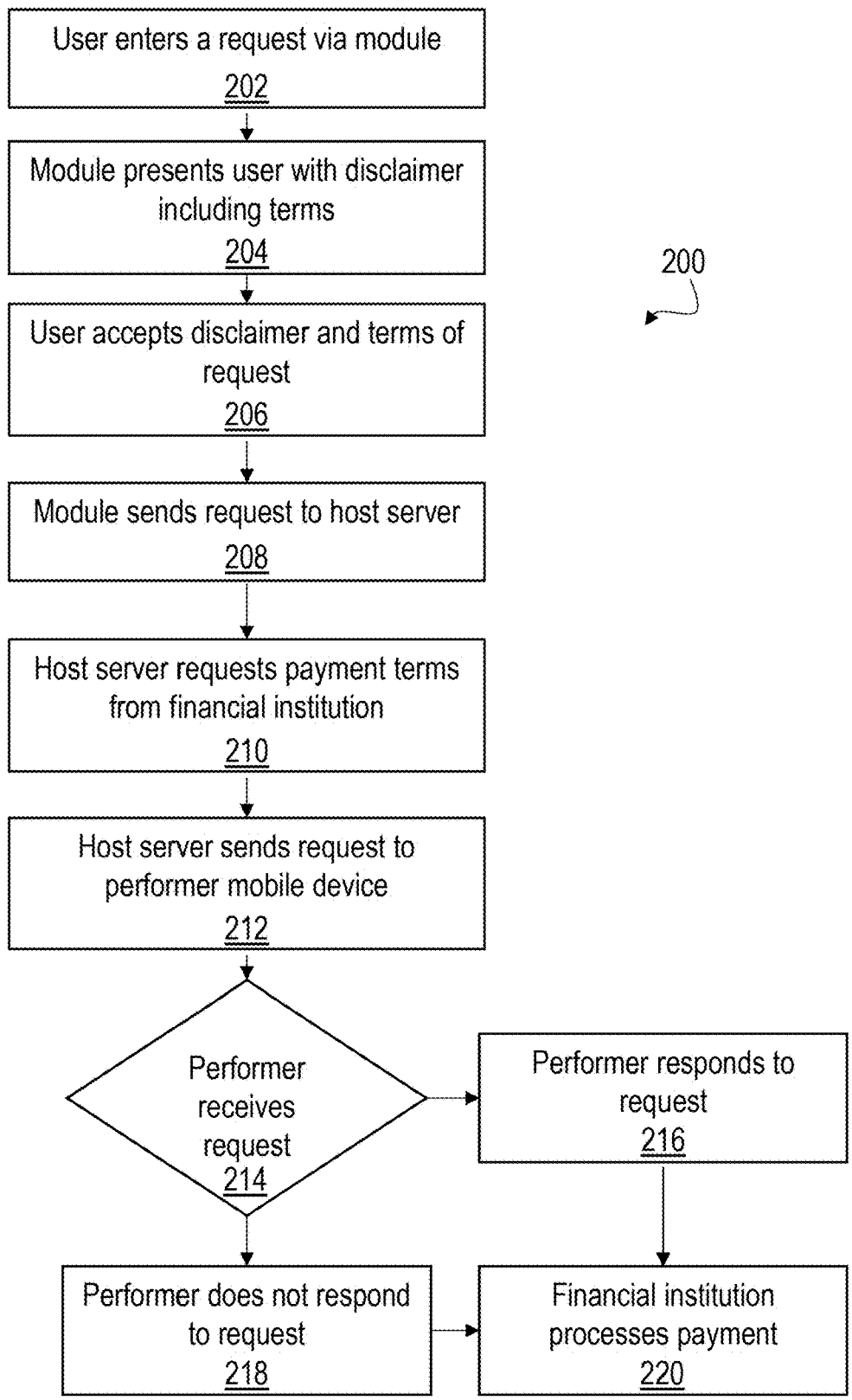
FIG. 2 depicts a flow diagram of a method of remotely interacting with a performer according to at least one non-limiting aspect of the present disclosure.

Referring now to FIG. 2, a flow diagram illustrating a method 200 of remotely interacting with a performer is depicted in accordance with at least one non-limiting aspect of the present disclosure. The method 200 commences when a user enters a request 202. As previously described, the user may initiate the request using a GUI displayed on an internet connected device, including smart phones, laptops, personal digital assistants, or personal desktop computers. In some non-limiting aspects, the GUI can be displayed on the internet connected device when a module stored on a memory of the device is executed by a processor of the device. Alternatively, the module can be stored on a memory of a remote "cloud" server that is accessible to the device.

In further reference to FIG. 2, the module can command the GUI to present the user with the terms and conditions that are associated with the request 204. As previously discussed, the terms and conditions associated with the request can be customized to the specific application desired by the performer. In the non-limiting aspect of the method 200 of FIG. 2, the terms and conditions specify that the payment will be processed regardless of whether or not the performer fulfills the request. For example, the DJ may not have the requested song available in their catalog. Alternatively, the DJ may decide that the song and/or "shout-out" would be inappropriate for that particular performance and therefore, decline the customer's request. According to the method 200 of FIG. 2, the customer concedes to the DJ's discretion and agrees to be charged to initiate the request by agreeing to the terms and conditions.

After the user reviews and accepts the terms and conditions, the module can send the request to the host server 208. According to the method 200 of FIG. 2, the host server sends the request, including any payment terms required by the terms and conditions, to the financial institution 210. This step can further include checking a linked account for the requisite funds, performing a conversion of currency, or processing the payment of a service fee required by the host server and/or financial institution. According to some non-limiting aspects, the payment term can be a pre-specified component of the terms and conditions. However, according to other non-limiting aspects, the payment term can be user-specified and collected via a separate user input. An example of one such aspect is described in reference to FIG. 5.

Still referring to the method 200 of FIG. 2, after confirming that the payment has been processed, the host server can send the request to the performer's mobile device 212. Having received the request, the performer has the option of fulfilling the request 214. For example, the DJ may review his catalog for the requested song, or scrub the requested "shout-out" for profanities. Accordingly, the DJ can accept the request 216 or decline the request 218. In the non-limiting method 200 of FIG. 2, both options result in the financial institution processing the payment 220. However, according to other non-limiting aspects, the host server may require a confirmation that the performer has fulfilled the request prior to processing the payment. If the request has not been fulfilled, the payment will not be processed and thus, the customer is not charged. According to such aspects, the method 200 includes an additional step of confirming that the request has been fulfilled. As previously noted, such a step can include using a microphone on the customer's mobile device and a sound recognition module stored in a memory of the host server. Alternatively, a confirmation step can include the performer providing such confirmation on the performer mobile device. For example, in some non-limiting aspects, the GUI can provide the customer with a catalog of songs (See FIG. 3B) to choose from when initiating the request. If the DJ plays the requested song from the catalog, the host server can be configured to automatically recognize that the song has been played from the catalog, thereby automatically confirming that the request has been fulfilled and processing the payment 220.

Finally, method 200 of FIG. 2 can further include a step that performs a spatio-temporal confirmation of the performer. In other words, the method 200 can further confirm that the performer is at the live event, prior to the user issuing the request and the financial institution processing the payment 220. This can be helpful in the non-limiting aspect wherein the customer is not present at the live event, but is issuing the request from a remote location. The spatio-temporal confirmation step can protect such a customer from being charged for issuing a request if the event is cancelled, delayed, or if the performer is otherwise incapable of fulfilling the request. Accordingly, method 200 can apply this, and further confirmations that could be beneficial for the customer, financial information, and performer alike, thereby instilling more confidence in the parties involved in the transaction and promoting increased use of the method 200 of FIG. 2 and system 100 of FIG. 1.

Referring now to FIGS. 3A-3D, several user interfaces of a mobile application as viewed by a using customer and configured to enable the remote interaction with a live performer are depicted in accordance with at least one non-limiting aspect of the present disclosure. Specifically, FIG. 3A depicts a first GUI 300 that can be presented to a using customer via a mobile device. The first GUI 300 can include multiple widgets to assist a customer in identifying a performer they want to interact with or a live event that they want to influence. For example, the GUI 300 can include a calendar widget 302 they can use to search for and identify a live event based on a desired date. Alternatively, a customer may search for a live event or performer using the search widget 304, which provides them with search flexibility. For example, the customer can use the search widget 304 to query a specific event type, performer name, or venue. The results of the query can be presented via a plurality of relevant live events 306 that meet the search criteria and are supported by the host server.

In reference to FIG. 3B, a second GUI 310 is depicted in accordance with at least one non-limiting aspect of the present disclosure. The second GUI 310 can be displayed once the customer has searched for and selected the desired live event using the first GUI 300. The second GUI 310 can display relevant information for the selected live event, including a profile widget 312 with the performer's avatar, curated playlists 314 created by the performer, and/or a plurality of individual songs 316 available in the performer's catalog. Alternatively and/or additionally, the second GUI 310 can include widgets configured to solicit details from the customer for a "shout-out" the customer wants to request. These widgets can include a form field, wherein the customer can enter the specific message they want announced or displayed during the live event. Such "shout-out" widgets can also include information regarding the timing and format of the message, as well as an option for the customer to upload an image from their mobile device that can be displayed during the live event, in association with the message.

In further reference to FIG. 3B, and in accordance with another non-limiting aspect of the present disclosure, the second GUI 310 can further include a "shout-out" recordation widget. According to this aspect, the customer can select the "shout-out" recordation widget and utilize a microphone of the customer mobile device to record a desired "shout-out," which can be digitized by the customer mobile device and sent to the host server as a signal accompanying the request. Upon receipt of the request, and pending the satisfaction of the terms and conditions, the performer mobile device can process the signal and replay the recorded "shout out" during the live event, thereby fulfilling the request. Alternatively and/or additionally, the customer mobile device can utilize a dictation module and a microphone to process a customer's verbal utterances into text. Accordingly, the customer can select the "shout-out" recordation widget to dictate a desired message into the form field without typing it. In such aspects, the textual message will then be sent to the host server, processed, and the request fulfilled in accordance with the aspect where the customer enters the textual message into the form field. This aspect can minimize the amount of attention required by the disclosed system and method and thus, enable the customer to further enjoy the live performance.

Referring now to FIG. 3C, a third GUI 320 is depicted in accordance with at least one non-limiting aspect of the present disclosure. The third GUI 320 can be displayed once the customer has searched for and selected a desire song to request using the second GUI 310. The third GUI 320 can display information for the selected song, including album art and artist name, thereby ensuring that the customer has selected the right song. The third GUI 320 can further include predetermined tip widgets 322 according to the terms and conditions stored on the host server. Alternatively, the performer can define the predetermined tip widgets 322 prior to the live event. The tip widgets 322 enable the customer to quickly and easily select a tip that can accompany a request, in compliance with the terms and conditions associated with the request. Accordingly, the host server will request a payment processed in the amount selected via tip widget 322 upon receiving the request from the customer mobile device. Additionally and/or alternatively, the third GUI 320 can include a custom tip widget 324. The custom tip widget 324 can direct the user to a form field on the third GUI 320 or initiate a separate GUI that solicits a specific tip quantity desired by the customer prior to issuing the request. In other non-limiting aspects, the third GUI 320 can include a "No Tip" widget 326, which does not associate a payment to the request. Thus, the third GUI 320 can be customized in accordance with the terms and conditions stored on the host server.

In reference to FIG. 3D, a fourth GUI 330 is depicted in accordance with at least one non-limiting aspect of the present disclosure. The fourth GUI 330 can be displayed when the customer initiates a request using the second GUI 310 and can present the customer with a few options. For example, the fourth GUI 330 can include a tip widget 336 and a "shout-out" widget 334. When the customer selects the tip widget 336, a separate GUI such as the third GUI 320 can be displayed, prompting the customer to either select or input a tip amount to be processed by the financial institution. The "shout-out" widget 334 can direct the user to a form field on the third GUI 320 or initiate a separate GUI that solicits a specific message from the customer to be displayed or announced by the performer, prior to issuing the request. Both the tip widget 336 and "shout-out" widget 334 can be customized in accordance with the terms and conditions associated with the request and stored on the host server, or can be predetermined by the performer prior to the live event commencing.

It shall be appreciated that the GUIs 300, 310, 320, 330 illustrated by FIGS. 3A-3D are non-limiting and presented for illustrative purposes. Accordingly, it is evident that the system disclosed herein can display any number of GUI's on the customer mobile device and that the content of such displays can be tailored to the specific live event, performer, or terms and conditions associated with the request. Nonetheless, the GUIs 300, 310, 320, 330 of FIGS. 3A-3D exhibit a mere selection of widgets, information, and functionality supported by various aspects of the present disclosure and implemented to enable the remote interaction with a performer.

Figures 4A, 4B:
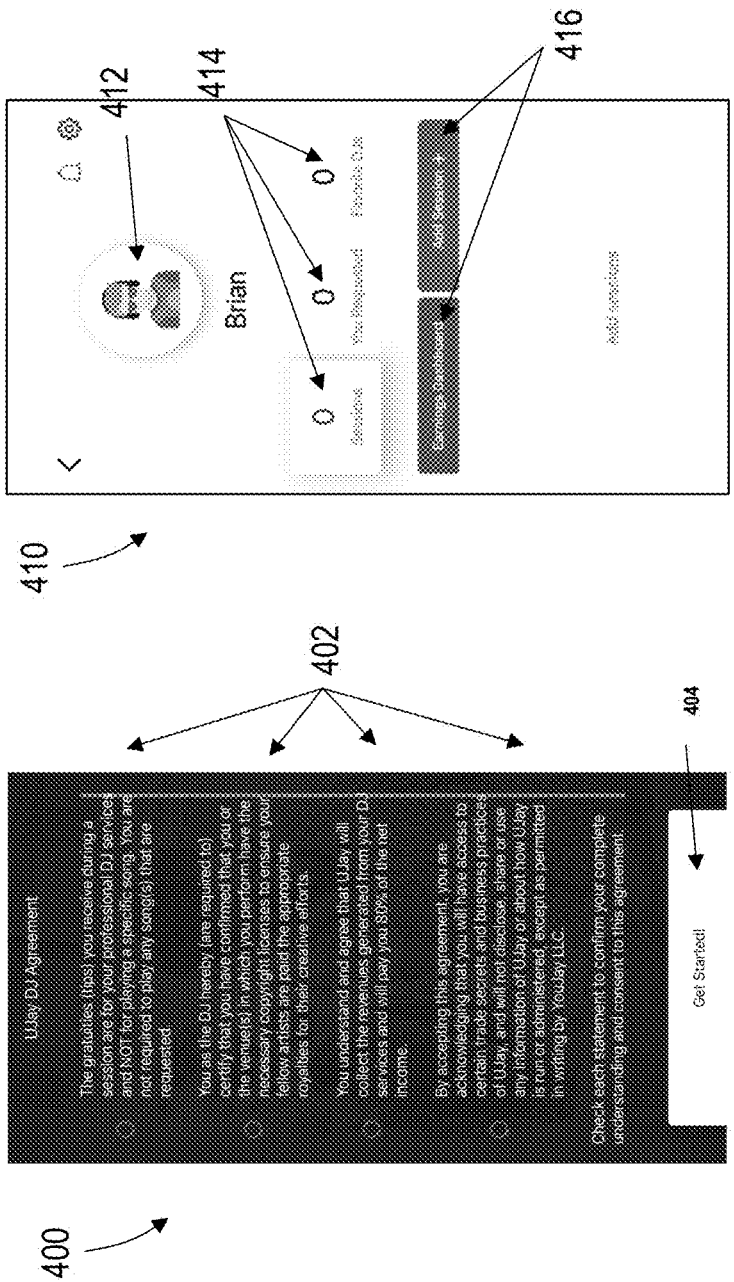

Referring now to FIGS. 4A-4H, several user interfaces of a mobile application as viewed by a live performer and configured to enable the remote interaction with a using customer are depicted in accordance with at least one non-limiting aspect of the present disclosure. Specifically, FIG. 4A depicts a first GUI 400 that can be presented to a live performer, such as a DJ, via a mobile device. The first GUI 400 can present the live performer with predetermined terms and conditions associated with use of the system and stored on the host server. For example, according to the non-limiting aspect wherein the live performer is a DJ, one of the terms and services might include a disclaimer notifying the DJ that they will be using the system to obtain tips for their services. Although the tip might accompany a request to play a particular song, the DJ might not be obliged to play the requested song. According to such aspects, the using customer might be presented with a corresponding term via one of the GUIs previously discussed in referenced to FIGS. 3A-3D. GUI 400 can further include a series of widgets 402 that must be engaged prior to the live performer proceeding with the desired use of the system. For example, such widgets might include radio buttons that must be pressed by the live performer in acknowledgment and agreement with the corresponding term and/or condition of use. Only after engaging each of the widgets 402, the live performer can select an initiation widget 404 to commence use of the system.

In reference to FIG. 4B, a second GUI 410 is depicted in accordance with at least one aspect of the present disclosure. After engaging of the required widgets on the first GUI 400, a live performer can be presented with the second GUI 410, which depicts the performer's profile and miscellaneous metrics associated with the performer's use of the system. For example, the second GUI 410 can include an avatar widget 412 that the performer can upload to the host server from the performer mobile device. The avatar widget 412 can be made publicly available via the system to assist using customers in identifying the live performer's scheduled events. The second GUI 410 can further include a series of metric widgets 414 configured to display valuable information pertaining to the live performer's events and use of the system. For example, the metric widgets 414 can display the number of requests the live performer has received and/or fulfilled, as well as the number of live events they have performed. Additionally and/or alternatively, the second GUI 410 can further include management widgets 416. Management widgets 416 can enable the live performer to view the amount of money they earned at a particular event and/or cumulative earnings. Additionally and/or alternatively, the second GUI 410 can include management widgets 416 that display the live performer's live events and/or enable the live performer to add and manage a live event.

Now referring to FIG. 4C, a third GUI 420 is depicted in accordance with at least one aspect of the present disclosure. The third GUI 420 can enable the live performer to associate venue details with the new event. The third GUI 420 can include a search widget 422, which enables the live performer to seek venues by entering general location information, such as a venue name, zip code, city, state, etc. After entering the general location information into the search widget 422, the third GUI 420 can be configured to display venues and addresses relevant to the general location information via a series of venue widgets 424. The live performer can engage the desired venue widget 424 to auto-populate the desired venue information into the host server via the third GUI 420.

Referring now to FIG. 4D, a fourth GUI 430 is depicted in accordance with at least one aspect of the present disclosure. The fourth GUI 430 can be displayed if the live performer chooses to add a new event via the management widgets 416 of the third GUI 410 either before or after the live performer enters venue details via third GUI 420. The fourth GUI 430 can include a series of form fields that enable the live performer to input relevant information about the new event. For example, the fourth GUI 430 can enter an event name via an event name widget 432, the genre of music they intend on performing via a genre widget 434, as well as timing widgets 435, 436 that enable the live performer to enter a date, start time, and end time for the new event. Additionally and/or alternatively, the fourth GUI 430 can further include a tip widget 437 and/or "shout-out" widget 438. Accordingly, the live performer can determine what degree of functionality, interaction, and influence they will afford using customers that attend the new event. More specifically, the live performer can enter a desired dollar amount associated with a tip and/or "shout-out" via a pricing widget 439. As such, the system and fourth GUI 430 can enable the live performer to customize the experience afforded to using customers in accordance with their preferences, venue requirements, and local laws and customs, etc.

Figure 4H:
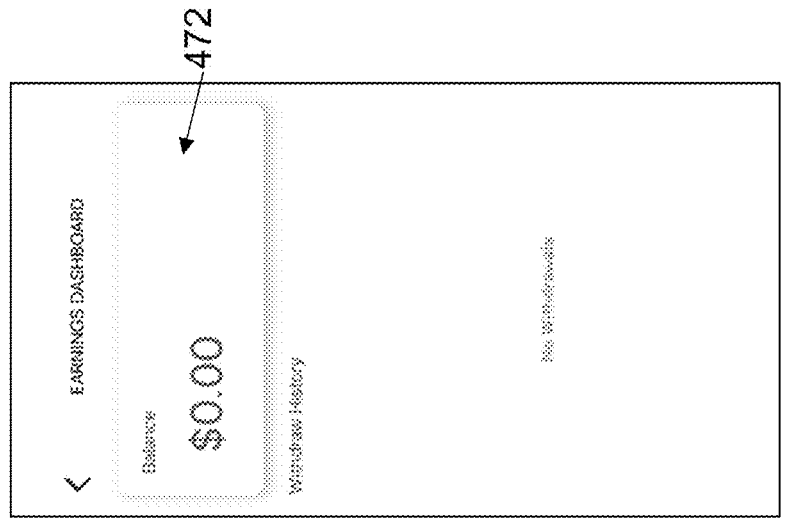
Figure 4G:
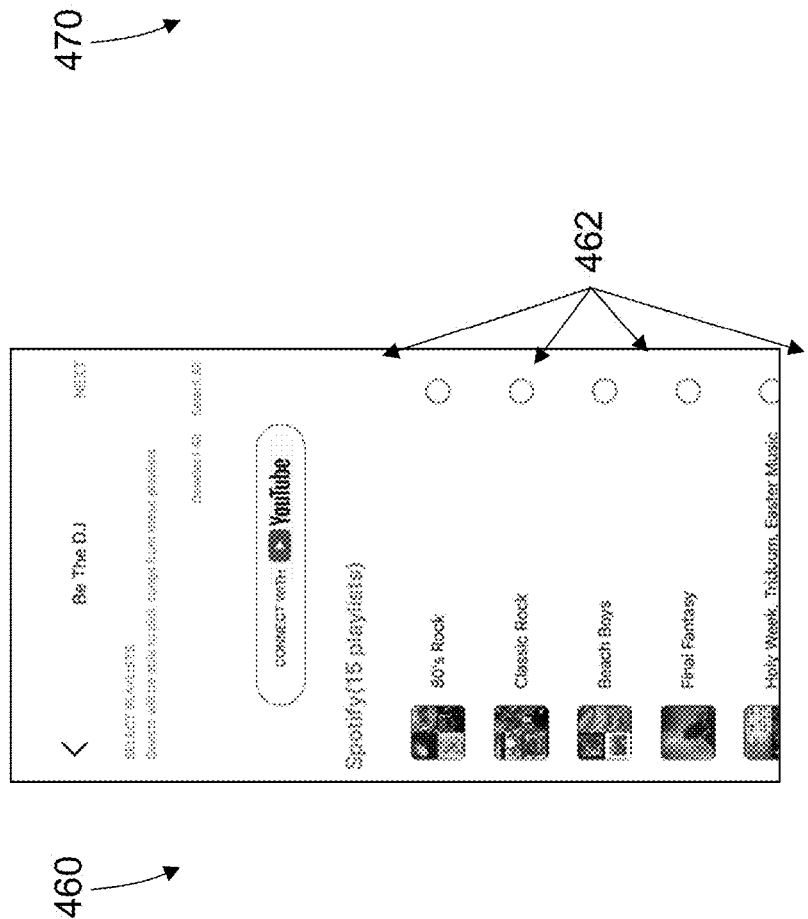

In reference to FIGS. 4E-4G, a fifth, sixth, and seventh GUI 440, 450, 460 can be presented to enable the live performer to create a list of content available to using customers. For example, if the live performer is a DJ, the fifth, sixth, and seventh GUI 440, 450, 460 can enable the live performer to import content such as a playlist, album, or song from a third-party music application, such as Spotify®, Apple® Music, and/or YouTube®. The fifth GUI 440 can present several content server widgets 442 that enable the live performer to access an account associated with each of these third-party applications. In FIG. 4F, a sixth GUI 450 is depicted after the live performer selects a desired content server widget 442 of the fifth GUI 440. The sixth GUI 450 can present the live performer with terms and conditions associated with the use of the selected third party via a series of third-party term widgets 452. Assuming the live performer agrees with the terms and conditions presented by sixth GUI 450, they can select the consent widget 454. Upon selecting the consent widget 454, the live performer can view content associated with the third-party music application via a series of content widgets 462 on a seventh GUI 460. Alternatively and/or additionally, the seventh GUI 460 can display content stored by the live performer on the host server of the system, independent of any third-party service. Generally, the content widgets 462 represent content and/or services the live performer hopes to make accessible to using customers.

Although the content widgets 462 of FIG. 4G are directed towards musical content, the content widgets 462 can be customized according to the live performer's preferences and the intended application of the system. For example, in other non-limiting aspects the system can be deployed at a sporting event. Accordingly, the content widgets 462 can be further configured to allow the using customer to provide the live performer with their assigned seat for jumbotron broadcasts and/or can enable the customer to upload their own content, such as videos/pictures, etc. Alternatively and/or additionally, the content server widget 442 of the fifth GUI 440 can be associated with various social media plug-ins, and the content widgets 462 of the seventh GUI 460 can include various tweets, pictures, and/or other user generated posts hosted by the third-party server. These examples are provided to illustrate how a live performer, venue, or host can use the system and GUIs of FIGS. 4A-4H to customize the experience for using customers and provide different means of interacting with live performers and/or influencing live events.

Referring now to FIG. 4H, an eighth GUI 470 is depicted in accordance with at least one aspect of the present disclosure. The eighth GUI 470 can include several performance widgets 472 to assist the live performer in tracking their performance and/or user engagement. For example, the performance widget 472 can be configured to display the live performer's earnings for a particular event and/or their cumulative earnings for a series of events hosted since using the system. Alternate graphical widgets can be presented on the eighth GUI 470 to assist the live performer in tracking their past performances and/or suggestions for improving future performances.

It shall be appreciated that the GUIs 400, 410, 420, 430, 440, 450, 460, 470 illustrated by FIGS. 4A-4H are non-limiting and presented for illustrative purposes. Accordingly, it is evident that the system disclosed herein can display any number of GUI's on the performer mobile device and that the content of such displays can be tailored to the specific live event, performer, or terms and conditions associated with the request. Nonetheless, the GUIs of FIGS. 4A-4H exhibit a mere selection of widgets, information, and functionality supported by various aspects of the present disclosure and implemented to enable the remote interaction with a performer.

Figure 5:
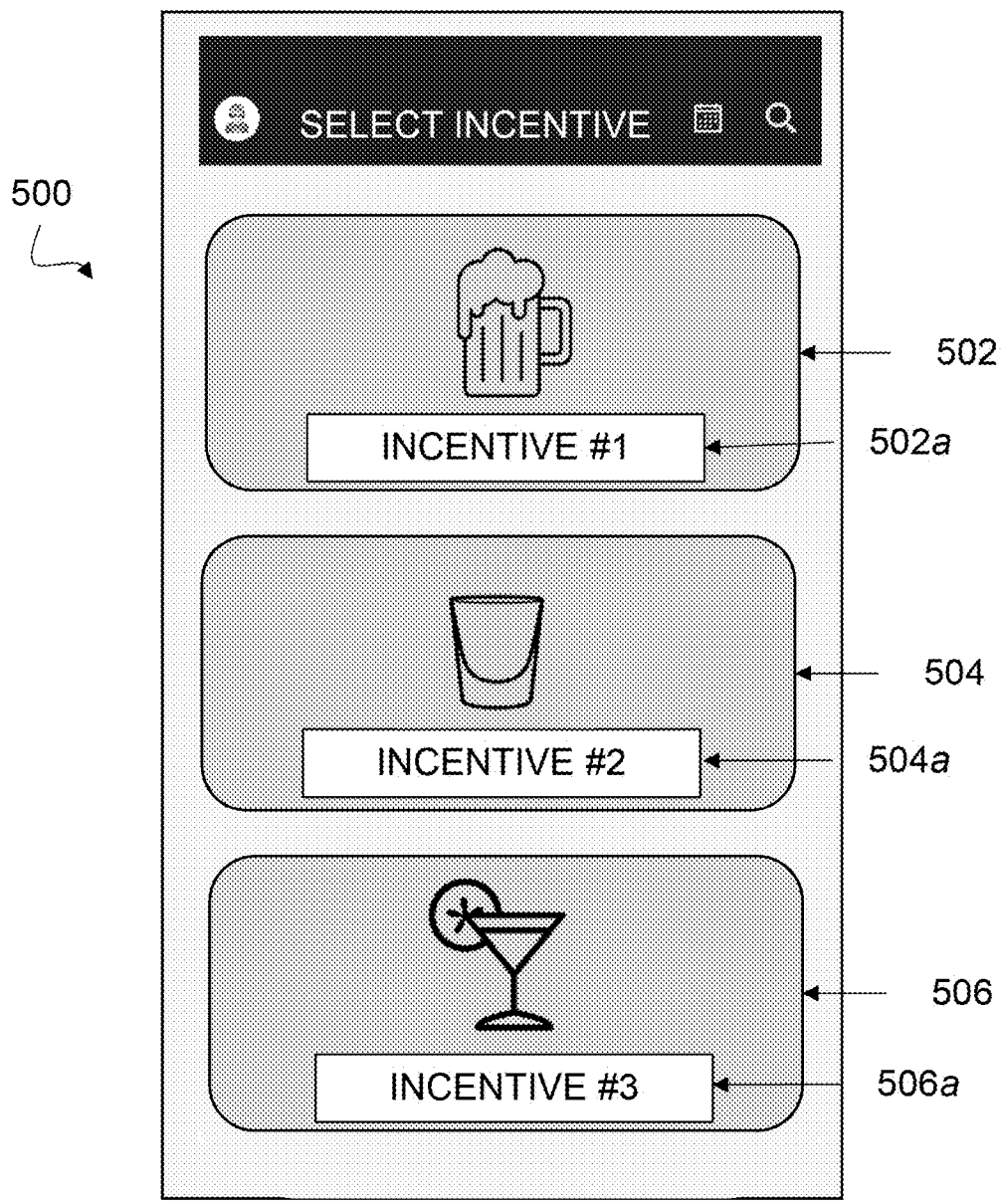
FIG. 5 depicts other user interfaces of a mobile application, as viewed by a using customer, configured to enable the remote interaction with a live performer according to at least one non-limiting aspect of the present disclosure.

Referring now to FIG. 5, another user interface 500 of a mobile application, as viewed by a using customer, configured to enable the remote interaction with a live performer, is depicted in accordance with at least one non-limiting aspect of the present disclosure. According to the non-limiting aspect of FIG. 5, the user interface 500 can include one or more widgets 502, 504, 506 associated with three different payment terms, or incentives, for the live performer to comply with a user-generated request. For example, the first widget 502 can be associated with a financial incentive similar to that of a cost of a beer. Accordingly, the first widget 502 can include an image of a beer and a text field 502a configured to be populated with the estimated cost of the beer. The second widget 504 can be associated with a financial incentive similar to that of a cost of a shot.

Accordingly, the second widget 504 can include an image of a shot and a text field 504a configured to be populated with the estimated cost of the shot. The third widget 506 can be associated with a financial incentive similar to that of a cost of a cocktail. Accordingly, the third widget 506 can include an image of a cocktail and a text field 506a configured to be populated with the estimated cost of the cocktail.

Although the widgets 502, 504, 506 can be used to visually and conceptually convey to a user the incentive they are offering the performer, certain aspects do not require the purchase of the selective incentive. In other words, the performer may not necessarily receive a beer, or a shot, or a cocktail. Rather, according to such aspects, the financial institution will process a payment associated with the selected widget 502, 504, 506, and of a value corresponding to the beer, shot, or cocktail, depending on which widget 502, 504, 506 the user selects. Accordingly, the performer will receive a financial incentive corresponding to the value of the selected widget 502, 504, 506 to comply with the user request. It shall be appreciated that the widgets provide the potential for advertising revenue. For example, instead of the generic widgets presented in FIG. 5, an implementing user can sell advertising rights to beer or liquor companies and display the logo or product of the advertising company on the widgets 502, 504, 506. Alternatively, the widgets 502, 504, 506 can be associated with any product or offer (e.g., food, ride-shares) depending on the marketing interest of the implementing user. According to some non-limiting aspects, the audience engagement opportunities presented by the user interface 500 of FIG. 5 can be used to connect users to third-party advertising partners and may be used to generate advertising revenues. For example, the user interface 500 may be displayed after the live performance to generate user input associated with an encore live performance (e.g., whether an encore should be performed, whether a particular song should be played during an encore). An auction term or crowd-sourcing term can be implemented in association with encore-based requests provided by the users. Thus, a third-party advertising partner may be motivated to sponsor one or more of the widgets 502, 504, 506 can be associated with any product or offer (e.g., food, ride-shares). Moreover, the system 100 (FIG. 1) can enable the live performer and/or the venue to scale pricing for such sponsorships based on the popularity of the band, popularity of the venue, number of participating audience members, etc.

Figure 6:
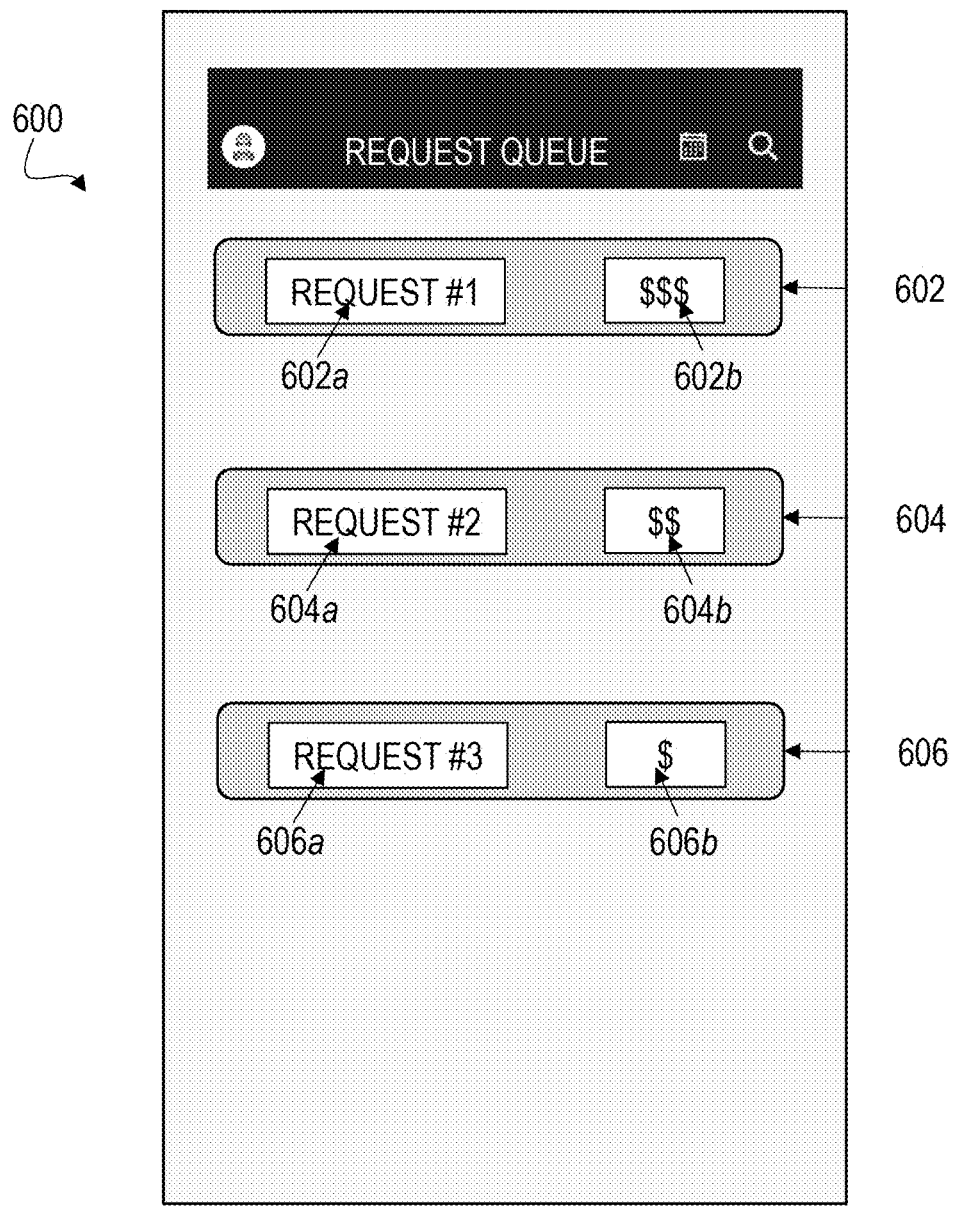
FIG. 6 depicts other user interfaces of a mobile application, as viewed by a live performer, configured to enable the remote interaction with a using customer according to at least one non-limiting aspect of the present disclosure.

Referring now to FIG. 6, another user interface 600 of a mobile application, as viewed by a live performer, configured to enable the remote interaction with a using customer, is depicted in accordance with at least one non-limiting aspect of the present disclosure. According to the non-limiting aspect of FIG. 6, the user interface 600 can include one or more widgets 602, 604, 606. For example, the user interface 600 of FIG. 6 illustrates three widgets 602, 604, 606, where each widget is associated with a user request. The first widget 602 can include a field displaying the specific request 602a and a field displaying the financial incentive associated with the request 602b. The financial incentive can be cumulative, meaning an aggregate of the financial incentives offered by each customer making that request. As is evident from a review of FIG. 6, the second widget 604 and the third widget 606 each have a field 604b, 606b displaying a lower financial incentive than the field 602b of the first widget 602. Each widget 602, 604, 606 is displayed in descending order, meaning the first widget 602, with the highest financial incentive 602b associated with it, is on the top. As such, the interface 600 of FIG. 6 enables a performer to visually discern which request is most requested, or more lucrative.

Figure 7:
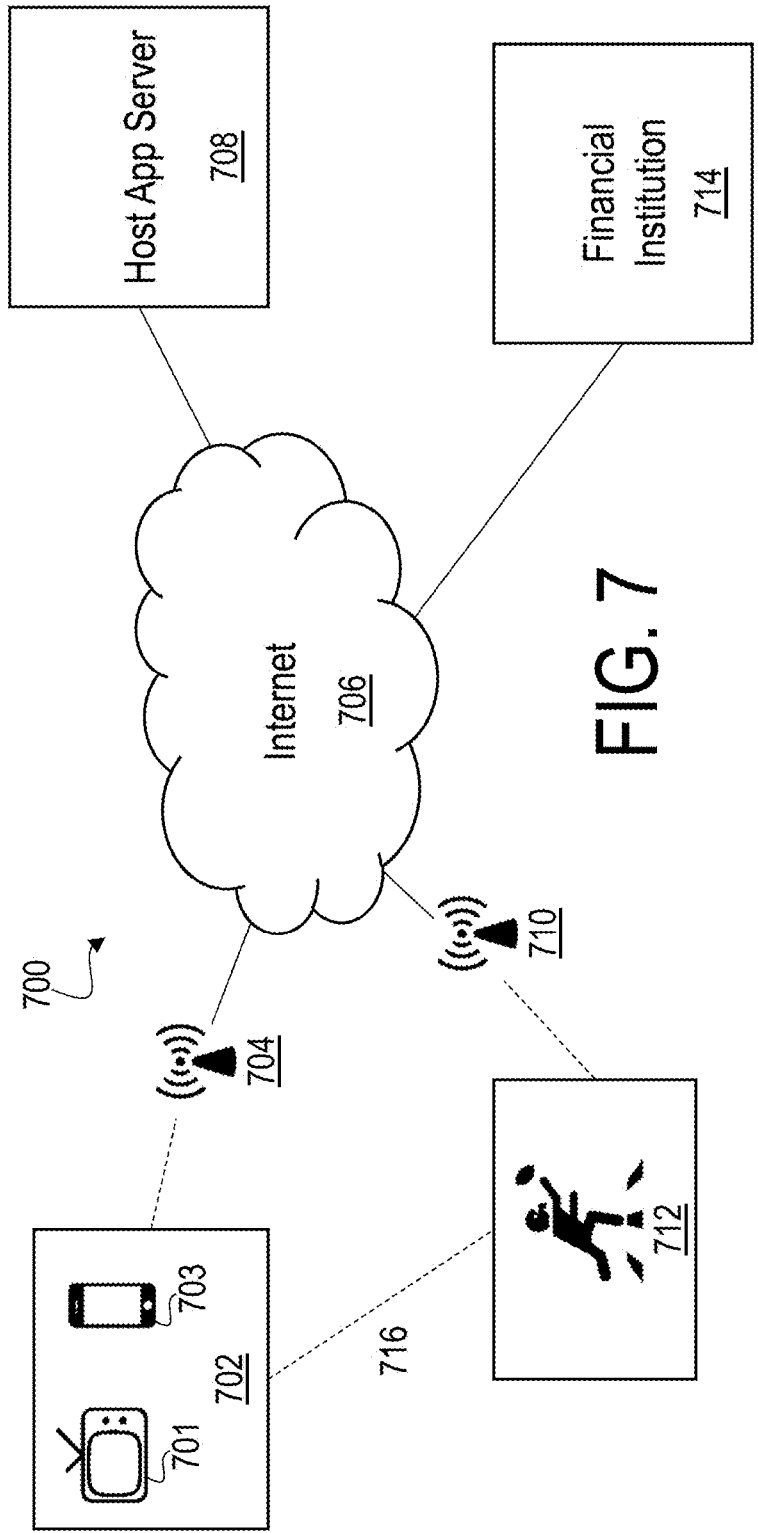
FIG. 7 depicts a system diagram of another system configured to enable a remote interaction with a live performer according to at least one non-limiting aspect of the present disclosure.

Referring now to FIG. 7, a system diagram of another system 700 configured to enable a remote interaction with a live performer is depicted in accordance with at least one non-limiting aspect of the present disclosure. Similar to the system 100 of FIG. 1, the system 700 of FIG. 7 can include a customer device 702, a performer device 712, one or more access points 704, 710 configured to connect the customer and performer devices 702, 712 to the internet 706, a host server 708, and a financial institution 714. However, according to the non-limiting aspect of FIG. 7, the customer device 702 of FIG. 7 can include a television 701 or a personal computing device 703, such as a mobile phone, a tablet, a laptop computer, a wearable, a personal digital assistant, and/or a desktop computer, amongst others. Notably, the customer device 702 can include any device configured to connect to the internet 706 via an access point 704. According to the non-limiting aspect of FIG. 7, the customer can include an individual watching a sporting event live on the television 701 or the personal computing device 703, or from the venue in which the sporting event is taking place.

As previously explained, the customer device 702 of the system 700 of FIG. 7 can be configured to display a GUI configured to receive customer inputs, such as the GUIs depicted in FIGS. 3A-3B and 4A-4H. Thus, according to some non-limiting aspects, any of the GUIs of FIGS. 3A-3B and 4A-4H—or portions thereof—can be augmented over, or otherwise integrated into, the live feed of the sporting event as displayed by the television 701 or personal computing device 703. The performer device 712 can include a television, a mobile phone, a tablet, a laptop computer, a wearable, a personal digital assistant, and/or a desktop computer, amongst other devices accessible to a coach, member of the coaching staff, athlete, or any other personnel contributing to the live sporting event. As such, the system 700 of FIG. 7 can enable an individual watching a live sporting event, either remotely or at the venue in which the sporting event is taking place, to influence the sporting event in a manner similar to those discussed in reference to the system 100 of FIG. 1.

For example, according to the non-limiting aspect of FIG. 7, an individual watching the live sporting event—via the customer device 702—can suggest and/or instruct a play executed during the live sporting event, by using the system 700 to ensure their suggestion and/or instruction is transmitted to the coach, member of the coaching staff, athlete, or any other personnel—via the performer device 712. According to some non-limiting aspects, this can be achieved via the method 200 of FIG. 2, wherein the request 204 (FIG. 2) includes the suggested or instructed play to be executed by the performer—or coach, member of the coaching staff, and/or athlete. As previously described, the term and/or condition associated with the request 204 (FIG. 2) can be customized to the specific application desired by the teams, sponsors, or league associated with the sporting event.

For example, a term of the request 204 (FIG. 2) can specify that the payment will be processed regardless of whether or not the coach, member of the coaching staff, athlete, or any other personnel fulfills the request, as depicted in FIG. 2. For example, the coach may determine that the requested play is not appropriate for that particular moment of the game or that the requested play is nonsensical and/or non-competitive. Alternately and/or additionally, a condition of the request 204 (FIG. 2) can specify that fulfillment of the request is subject to an auction, wherein each request is accompanied by a conditional bid and a request of the highest bidder is fulfilled. According to other non-limiting aspects, a play may be "crowd-sourced," wherein a plurality of user devices 702 of the system 700 of FIG. 7 can submit requests subject to any of the aforementioned terms and/or conditions. The requests can be aggregated and the most requested play is selected by the coach, member of the coaching staff, and/or athlete during the game.

After the user—via the customer device 702—can review and accept the terms and conditions, the module can send 208 (FIG. 2) the request to the host server 708, which can send 210 (FIG. 2) the request, including any payment terms required by the terms and conditions, to the financial institution 714. This step can further include checking a linked account for the requisite funds, performing a conversion of currency, or processing the payment of a service fee required by the host server and/or financial institution. According to some non-limiting aspects, the payment term can be a pre-specified component of the terms and conditions. However, according to other non-limiting aspects, the payment term can be user-specified and collected via a separate user input, as described in reference to FIG. 5. After confirming that the payment has been processed, the host server 708 can send 212 (FIG. 2) the request to the performer device 712 of the coach, member of the coaching staff, athlete, or any other personnel at the game. Having received the request, the coach, member of the coaching staff, athlete, or any other personnel at the game has the option of fulfilling 214 (FIG. 2) the request, in compliance with the terms and conditions agreed to by the user via the customer device 702.

Figure 8:
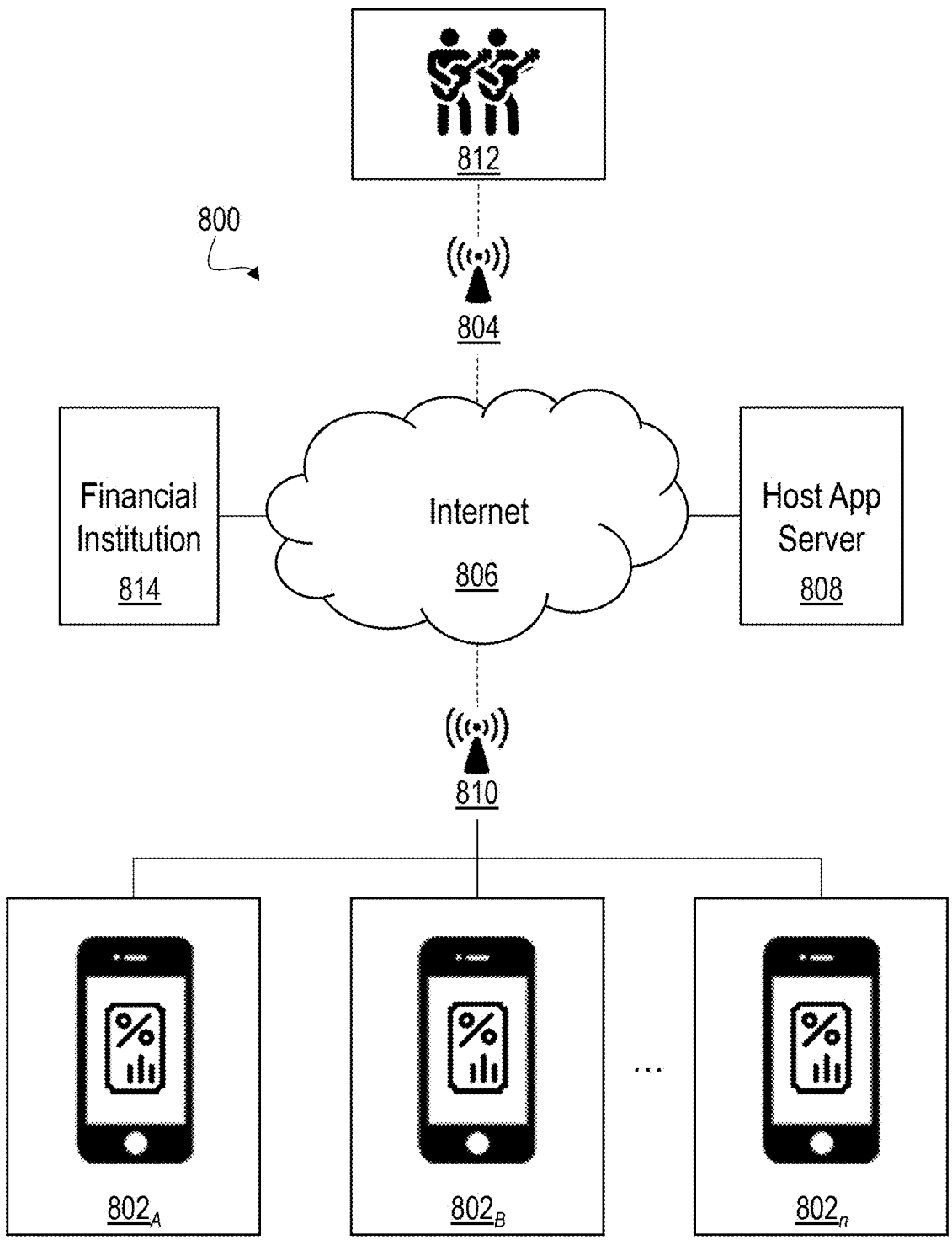
FIG. 8 depicts a system diagram of another system configured to enable a remote interaction with a live performer according to at least one non-limiting aspect of the present disclosure.

Referring now to FIG. 8, a system diagram of another system configured to enable a remote interaction with a live performer is depicted in accordance with at least one non-limiting aspect of the present disclosure. According to the non-limiting aspect of FIG. 8, the system 800 can include a plurality of customer devices $802_{A-n}$, each of which may belong to a user watching a live event performed via a performer with a performer device 812. Similar to the systems 100, 700 of FIGS. 1 and 7, the system 800 of FIG. 8 can further include one or more access points 804, 810 configured to connect the plurality of customer devices $802_{A-n}$ and the performer device 812 to the internet 806, a host server 808, and a financial institution 814. The plurality of customer devices $802_{A-n}$ and performer device 812 of FIG. 8 can include a television, a mobile phone, a tablet, a laptop computer, a wearable, a personal digital assistant, and/or a desktop computer, amongst other personal computing devices.

In further reference to the non-limiting aspect of FIG. 8, the system 800—via the host server 808, for example—can distribute a plurality of coupons to each of the plurality of customer devices $802_{A-n}$ in exchange of user requests submitted to the performer by users of the system 800. The coupons can be redeemed for free and/or discounted products or services provided by the performer, the venue, and/or a partnering third party, in accordance with an agreed-upon term and/or condition. According to some non-limiting aspects, one or more coupons generated and distributed by the system 800 to each of the plurality of customer devices $802_{A-n}$ may be "complete," meaning the coupon can be redeemed without additional actions required of the user. However, according to other non-limiting aspects, one or more coupons generated and distributed by the system 800 to the plurality of customer devices $802_{A-n}$ may be "partial," meaning the coupon cannot be redeemed without additional actions being taken by the user. The actions may be outlined via a term and/or condition the user must agree to via a module on the customer device $802_{A-n}$. The actions can include a required interaction between one or more of the plurality of customer devices $802_{A-n}$. For example, a partial coupon generated and distributed by the system 800 may require that a user of a first customer device $802_A$ locate and interact with a user of a second customer device $802_B$ in order to complete the partial coupons distributed to the first customer device $802_A$ and the second customer device $802_B$.

Still referring to FIG. 8, the required interaction between the first customer device $802_A$ and the second customer device $802_B$ can include a communication via an ad hoc network (e.g., Bluetooth®, NFC) established between the first customer device $802_A$ and the second customer device $802_B$. According to other non-limiting aspects, an application program interface can be deployed via an application executed or otherwise accessed by the customer devices $802_{A-n}$ in order to facilitate user communications via a social media platform (e.g., Facebook®, Instagram®, TikTok®, Twitter®, Snapchat®). This can facilitate and/or enable interactions between the user of the first customer device $802_A$ and the user of the second customer device $802_B$, thereby making it easier to complete the partial coupons generated and distributed by the system 800.

According to other non-limiting aspects, the system 800 of FIG. 8 can be configured to generate and distribute partial coupons that require unilateral actions to be taken by one or more users of the plurality of customer devices $802_{A-n}$ in order to complete the partial coupons for use. For example, a user—via the customer mobile device $802_{A-n}$—may be required to provide the live performer, venue, and/or event sponsor, user data, such as a valid email address, physical address, phone number, and/or a consumer preference, amongst other forms of user data that can be used for marketing purposes. According to some non-limiting aspects, the user may be required to agree to the sharing and/or sale of the provided user data prior to being able to submit the request. According to other non-limiting aspects, the user may be required to forward a notification to a friend—including an alert that the user is at the particular event and/or particular venue, a consumer suggestion, and/or a coupon, amongst other notifications—prior to being able to submit the request. According to still other non-limiting aspects, the user may be required to purchase of another product or service via a website accessed via the customer mobile device $802_{A-n}$, complete a survey accessed via the customer mobile device $802_{A-n}$, and/or completion of an engagement action (e.g., creating a post, liking a post, commenting on a post, sharing a post) associated with the venue and/or event via a social media platform (e.g., Facebook®, Instagram®, TikTok®, Twitter®, Snapchat®), amongst other user actions—prior to completing and being able to use the partial coupon. Therefore, according to such non-limiting aspects, the financial institution 814 of the system 800 of FIG. 8 can include an ecommerce server, a venue server, a social media platform server, and/or an email server, amongst other servers configured to confirm that an action-based term and/or condition has been fulfilled.

According to some non-limiting aspects, the present disclosure contemplates a computer-implemented method of remotely influencing a performer at a live event via a customer device of a user. The customer device can include a display, a memory and a processor, and software can be preloaded onto the memory of the customer device that, when executed by the processor, causes the processor to perform the method. The method can include displaying, via the display, a GUI configured to receive user inputs, receiving, via the GUI, a first user input comprising a user request for the performer to take a user-specified action during the live event, displaying, via the GUI, terms and conditions associated with the user request, receiving, via the GUI, a second user input comprising a user acceptance of the terms and conditions associated with the user request, and transmitting, via the processor, the user request to a performer device upon receiving the user acceptance of the terms and conditions associated with the user request.

In some non-limiting aspects, the user request can include an incentive for the performer to comply with the user request.

In some non-limiting aspects, the incentive can include a fiat-based payment.

In some non-limiting aspects, the incentive can include at least one of a cryptocurrency, a line of credit, membership rewards points, or loyalty rewards points.

In some non-limiting aspects, the incentive can include at least one of a provision of user data, completion of a user-initiated promotion, completion of a purchase, completion of a survey, or completion of an engagement action via a social media platform.

In some non-limiting aspects, the live event can include a sporting event.

In some non-limiting aspects, the user request can include a play to be executed during the sporting event.

In some non-limiting aspects, the user request is one of a plurality of user requests received by a host server, and the method can further include aggregating, via the host server, the plurality of user requests received by the host server, and determining, via the host server, that the user request is a most requested request of the plurality of user requests.

In some non-limiting aspects, the terms and conditions can include an auction term, the user request can include a user-generated payment term, and the method can further include comparing, via a host server, the user-generated payment term to a previously-generated payment term stored on the host server, and determining, via the host server, that the user-generated payment term is larger than the previously-generated payment term stored on the host server.

In some non-limiting aspects, the previously-generated payment term stored on the host server can be generated by another user.

In some non-limiting aspects, the user request can include at least one of a request to be featured on a display installed at a venue hosting the sporting event, a shout-out, a birthday message, a marriage proposal, an advertisement, or a segment sponsorship.

In some non-limiting aspects, the user request can include a suggested song to be played during an encore.

In some non-limiting aspects, the user request can include one of a plurality of user requests received by a host server, and the method can further include aggregating, via the host server, the plurality of user requests received by the host server, and determining, via the host server, that the user request is the most requested of the plurality of user requests.

In some non-limiting aspects, the method can further include displaying, via the GUI, a third-party sponsored advertisement prior to receiving user inputs.

In some non-limiting aspects, the live event can include a live stream, a video game demonstration, or an e-sports event.

According to some non-limiting aspects, the present disclosure contemplates a computer-implemented method of remotely influencing a performer at a live event via a customer device of a user. The customer device can include a display, a processor, and a memory configured to store an application that, when executed by the processor, causes the processor to perform the method. The method can include displaying, via the display, a GUI configured to receive user inputs, receiving, via the GUI, a first user input comprising a user request for the performer to take a user-specified action during the live event, displaying, via the GUI, terms and conditions associated with the user request, receiving, via the GUI, a second user input comprising a user acceptance of the terms and conditions associated with the user request, transmitting, via the processor, the user request to a performer device upon receiving the user acceptance of the terms and conditions associated with the user request, and receiving, via the processor, a coupon to be displayed via GUI.

In some non-limiting aspects, wherein the coupon can only be redeemed upon completion of an additional action being taken by the user.

In some non-limiting aspects, the additional action can include an interaction with a second user via a second customer device.

In some non-limiting aspects, the interaction can include a communication via an ad hoc network established between the customer device and the second customer device.

In some non-limiting aspects, the interaction can include a communication via social media platform.

According to some non-limiting aspects, the present disclosure contemplates a system for remotely influencing a performer at a live event. The system can include a host server, a performer device, and a customer device. The customer device can include a processor and a memory configured to store an application that, when executed by the processor, causes the customer device to display a GUI configured to receive user inputs, receive, via the GUI, a first user input comprising a user request for the performer to take a user-specified action during the live event, receive, via the processor, terms and conditions associated with the user request from the host server, display, via the GUI, the terms and conditions associated with the user request, receive, via the GUI, a second user input comprising a user acceptance of the terms and conditions associated with the user request, and transmit, via the processor, the user request to the performer device upon receiving the user acceptance of the terms and conditions associated with the user request.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method of remotely influencing a performer at a live event via a customer device comprising a display, a processor, and a memory configured to store an application that, when executed by the processor, causes the processor to perform the method, the method comprising:

displaying, via the display, a graphical user interface configured to receive user inputs;

receiving, via the graphical user interface, a first user input comprising a user request for the performer to take a user-specified action during the live event;

receiving, via the graphical user interface, a second user input comprising a user acceptance of a term associated with the user request;

transmitting, via the processor, the user request to a performer device associated with the performer upon the processor receiving a user acceptance of the term associated with the user request;

detecting, via a microphone of the customer device, sound waves; and confirming, via the processor, that the performer has taken the user-specified action during the live event based on the detected sound waves.

2. The computer-implemented method of claim 1, further comprising displaying, via the graphical user interface, the term associated with the user request.

3. The computer-implemented method of claim 1, wherein the user request is one of a plurality of user requests for the performer to take a plurality of user-specified actions during the live event, wherein the plurality of user requests are received, by a host server, from a plurality of customer devices.

4. The computer-implemented method of claim 3, further comprising:

aggregating, via the host server, the plurality of user requests; and assessing, via the host server, the plurality of user requests for a most requested action associated with the plurality of user requests.

5. The computer-implemented method of claim 4, wherein the user request transmitted to the performer device is the most requested action associated with the plurality of user requests.

6. The computer-implemented method of claim 1, wherein the live event comprises a start time and an end time, and wherein the user request transmitted to the performer device is for the performer to take the user-specified action between the start time and the end time of the live event.

7. The computer-implemented method of claim 6, wherein the live event is one of a plurality of events, wherein each live event of the plurality of events comprises a start time and an end time.

8. The computer-implemented method of claim 7, wherein the method is repeated for each event of the plurality of events.

9. The computer-implemented method of claim 1, wherein the term comprises a crowd-sourcing term.

10. The computer-implemented method of claim 1, wherein the term comprises an auction term.

11. The computer-implemented method of claim 1, wherein the term comprises an incentive for the performer to comply with the user request.

12. The computer-implemented method of claim 1, wherein the live event is a musical event.

13. The computer-implemented method of claim 1, wherein the user-specified action comprises a song to be played during the live event.

14. The computer-implemented method of claim 1, further comprising:

implementing, via the processor, the term associated with the user request based on the confirmation that the performer has taken the user-specified action during the live event.

15. The computer-implemented method of claim 14, wherein implementing the term associated with the user request comprises causing, via the processor, a financial institution server to process a payment associated with the user request.

16. The computer-implemented method of claim 1, wherein the detected sound waves comprise an analog form, and wherein the method further comprises:

converting, via an analog-to-digital converter, the analog form of the detected sound waves into a digital form of the detected soundwaves, and wherein confirming that the user request has been fulfilled is further based on the digital form of the detected sound waves.

17. The computer-implemented method of claim 16, further comprising:

recording, via the microphone, the sound waves, and wherein the user request comprises a request for the performer to play the sound waves during the live event.

18. The computer-implemented method of claim 1, further comprising:

performing, via the processor, a spatio-temporal confirmation based on a determined location of the live event, and wherein transmission of the user request to the performer device associated with the performer is further based on the spatio-temporal confirmation.

19. A computer-implemented method of remotely influencing a performer at a live event via a customer device comprising a display, a processor, and a memory configured to store an application that, when executed by the processor, causes the processor to perform the method, the method comprising:

performing, via the processor, a spatio-temporal confirmation that the performer is at the live event;

displaying, via the display, a graphical user interface configured to receive user inputs;

displaying, via the graphical user interface, a term associated with a user request;

receiving, via the graphical user interface, a first user input comprising the user request for the performer to take a user-specified action during the live event; and transmitting, via the processor, the user request to a performer device associated with the performer based on the spatio-temporal confirmation.

20. The computer-implemented method of claim 19, further comprising receiving, via the graphical user interface, a second user input comprising a user acceptance of the term associated with the user request.

21. A computer-implemented method of remotely influencing a performer at a live event via a customer device comprising a display, a processor, and a memory configured to store an application that, when executed by the processor, causes the processor to perform the method, the method comprising:

determining, via the processor, a location of the live event;

performing, via the processor, a spatio-temporal confirmation that the performer is at the live event based on the determined location of the live event;

displaying, via the display, a graphical user interface configured to receive user inputs;

receiving, via the graphical user interface, a first user input comprising a user request for the performer to take a user-specified action during the live event; and transmitting, via the processor, the user request to a performer device associated with the performer based, at least in part, on the spatio-temporal confirmation.

22. The computer-implemented method of claim 21, further comprising displaying, via the graphical user interface, a term associated with the user request.

23. The computer-implemented method of claim 21, further comprising receiving, via the graphical user interface, a second user input comprising a user acceptance of a term associated with the user request.

* * * * *